United States Patent [19]

Bloy et al.

(10) Patent No.: US 10,423,307 B2
(45) Date of Patent: Sep. 24, 2019

(54) SYSTEM AND METHOD FOR INDICATING DATA TRANSFER METHOD SELECTION

(71) Applicant: The Toronto-Dominion Bank, Toronto (CA)

(72) Inventors: Adrian Bloy, Toronto (CA); Sébastien Forget, Toronto (CA); Ryan Edmund Vekeman, Toronto (CA); Connie Maun-Fong Chan, Toronto (CA); Daniel Lam Tin Cheung, Toronto (CA); Arun Victor Jagga, Toronto (CA); John Jong-Suk Lee, Toronto (CA)

(73) Assignee: The Toronto-Dominion Bank, Toronto, Ontario (CA)

( * ) Notice: Subject to any disclaimer, the term of this patent is extended or adjusted under 35 U.S.C. 154(b) by 70 days.

(21) Appl. No.: 15/648,039

(22) Filed: Jul. 12, 2017

(65) Prior Publication Data

US 2019/0018552 A1 Jan. 17, 2019

(51) Int. Cl.
*G06F 3/0482* (2013.01)
*G06F 3/0481* (2013.01)
*G06F 13/362* (2006.01)

(52) U.S. Cl.
CPC ........ *G06F 3/0482* (2013.01); *G06F 3/04817* (2013.01); *G06F 13/362* (2013.01)

(58) Field of Classification Search
CPC .................................................. G06F 3/04817
USPC .......... 715/761–765, 740, 780, 851
See application file for complete search history.

(56) References Cited

U.S. PATENT DOCUMENTS

| | | | |
|---|---|---|---|
| 7,093,198 B1 | 8/2006 | Paatero et al. | |
| 8,360,329 B2 | 1/2013 | Grigg et al. | |
| 9,076,142 B2 | 7/2015 | Adolphe | |
| 9,286,561 B2 | 3/2016 | Olson et al. | |
| 9,454,185 B2 | 9/2016 | Ivanchenko | |
| 2010/0230301 A1 | 9/2010 | Fellig | |
| 2013/0191227 A1 | 7/2013 | Pasa et al. | |
| 2015/0002275 A1* | 1/2015 | Jantunen | H04W 4/008 340/10.51 |

(Continued)

FOREIGN PATENT DOCUMENTS

| | | |
|---|---|---|
| WO | 2009112897 | 9/2009 |
| WO | 2015112545 | 7/2015 |

*Primary Examiner* — Cao H Nguyen
(74) *Attorney, Agent, or Firm* — Rowand LLP

(57) ABSTRACT

An electronic device for indicating selection of a data transfer method is disclosed. A processor is coupled to an input interface module and an output interface module. A memory is coupled to the processor and stores an application comprising instructions to cause the device to display indications corresponding to a plurality of data transfer methods via the output interface module, receive a selection of one of the methods for use in making a subsequent data transfer, retrieve a graphical element corresponding to the selected method, configure the device for making data transfers using the selected method, and indicate the device is operable to perform data transfers using the selected method by presenting the graphical element in the interface of the application whenever the interface is displayed via the output interface module or by modifying an icon for launching the application to correspond to the graphical element.

20 Claims, 10 Drawing Sheets

(56) References Cited

U.S. PATENT DOCUMENTS

| | | | |
|---|---|---|---|
| 2015/0178693 A1* | 6/2015 | Solis | G06Q 30/06 |
| | | | 705/30 |
| 2015/0206105 A1* | 7/2015 | Suzukake | G06Q 20/105 |
| | | | 705/39 |
| 2017/0024722 A1* | 1/2017 | Mhun | G06F 1/165 |
| 2017/0039535 A1* | 2/2017 | Park | G06Q 20/102 |
| 2017/0068421 A1 | 3/2017 | Carlson | |

\* cited by examiner

US 10,423,307 B2

SYSTEM AND METHOD FOR INDICATING DATA TRANSFER METHOD SELECTION

TECHNICAL FIELD

The present application relates to electronic user interfaces, and, more particularly, to indicating selection of a data transfer method in the user interface of an electronic device.

BACKGROUND

Electronic devices may be utilized to perform various types of data transfers. In some cases, dedicated applications may be provided that allow performance of data transfers. Such data transfer applications may support more than one data transfer method, selectable by a user.

Data transfer applications may also support performing data transfers for which they have been readied even if that application is not running in the foreground. For example, a data transfer may be performed when the application is not displayed on the device such as when a system screen is being displayed by the operating system.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
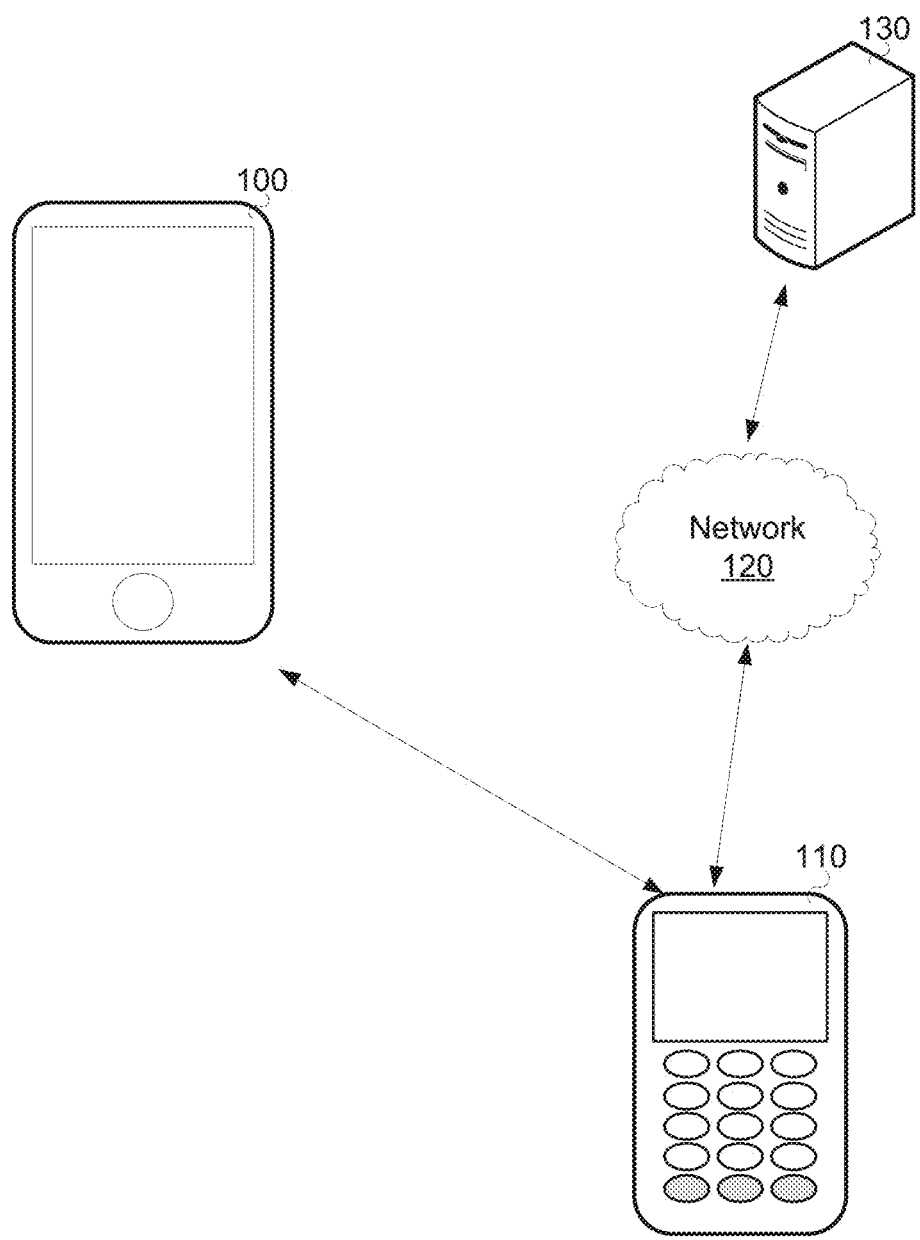
FIG. 1 is a schematic operation diagram illustrating an operating environment of an example embodiment.

In one aspect, there is provided an electronic device comprising: an input interface module; an output interface module; a processor coupled to the input interface module and the output interface module; a memory coupled to the processor and storing a data transfer application comprising instructions which, when executed by the processor, cause the electronic device to: display, via the output interface module, indications corresponding to a plurality of data transfer methods; receive, via the input interface module, a selection of one of the data transfer methods for use in making a subsequent data transfer; retrieve a graphical element corresponding to the selected data transfer method; configure the electronic device for making data transfers using the selected data transfer method; and indicate the electronic device is operable to perform data transfers using the selected data transfer method by at least one of: presenting the graphical element in an interface of the data transfer application whenever the interface is displayed via the output interface module, and modifying an icon for launching the data transfer application to correspond to the graphical element.

In another aspect, there is provided a computer-implemented method comprising: displaying, via an output interface module of an electronic device, indications corresponding to a plurality of data transfer methods available in a data transfer application; receiving, via an input interface module of the electronic device, a selection of one of the data transfer methods for use in making a subsequent data transfer; retrieving a graphical element corresponding to the selected data transfer method; configuring the electronic device for making data transfers using the selected data transfer method; and indicating the electronic device is operable to perform data transfers using the selected data transfer method by at least one of: presenting the graphical element in an interface of the data transfer application whenever the interface is displayed via the output interface module, and modifying an icon for launching the data transfer application to correspond to the graphical element.

In another aspect, there is provided a non-transitory computer readable storage medium storing instructions which, when executed by a processor of an electronic device, cause the electronic device to: display, via an output interface module of the electronic device, indications corresponding to a plurality of data transfer methods available in a data transfer application; receive, via an input interface module of the electronic device, a selection of one of the data transfer methods for use in making a subsequent data transfer; retrieve a graphical element corresponding to the selected data transfer method; configure the electronic device for making data transfers using the selected data transfer method; and indicate the electronic operable to perform data transfers using the selected data transfer method by at least one of: presenting the graphical element in an interface of the data transfer application whenever the interface is displayed via the output interface module, and modifying an icon for launching the data transfer application to correspond to the graphical element.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In some data transfer applications, after a user selects a supported data transfer method, the selected method may not be apparent in the user interface of those data transfer applications other than in the screen of the user interface where that method was selected. However, in at least some embodiments of the present disclosure, the user interface of a data transfer application executing on an electronic device may be modified based on display elements corresponding to a selected data transfer method. Conveniently, in this way, a user may determine the selected method whenever any user interface of the data transfer application is displayed without resort to reviewing the data transfer method selection screen of the user interface.

In one example, the user interface of the data transfer application may be modified to include one or more elements identifying the selected data transfer method. Additionally or alternatively, the user interface of the data transfer application may be modified with elements corresponding to a brand or trademark associated with the selected data transfer method. For example, where the selected data transfer method is a payment method, the user interface may be modified based on an issuer or network of the selected payment method. In a specific example, the user interface may be modified to correspond to a financial institution that issued a payment card corresponding to the selected payment method such as, for example, by including the name or logo of the financial institution in the displayed user interface.

Additionally or alternatively, one or more system screens of the operating system of the electronic device may be modified to reflect the selected method. Reflecting the selected method in system screens may allow the selected data transfer method to be ascertained even when the display is not showing the user interface of the data transfer application.

FIG. 1 is a schematic operation diagram illustrating an operating environment of an example embodiment.

As illustrated, an electronic device 100 may perform data transfers with other devices such as, for example, a terminal 110. The terminal 110 may also perform data transfers with other computing devices such as via a network 120. For example, as illustrated, the terminal 110 may transfer data to/from a server 130 via the network 120.

The electronic device 100 is a computer system. In some embodiments, the electronic device 100 may be a portable electronic device. For example, the electronic device 100 may, as illustrated, be a smartphone. However, the electronic device 100 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In certain embodiments, the electronic devices may be associated with one or more users. For instance, a user may operate the electronic device, and may do so to cause the electronic devices to perform one or more operations consistent with the disclosed embodiments. In some embodiments, the electronic device 100 may include a smart card, chip card, integrated circuit card (ICC), and/or other card having an embedded integrated circuit.

The terminal 110 is a computer system. In some embodiments, the terminal 110 may be a particular type of computing device such as, for example, point-of-sale (POS) terminal, also referred to as a payment terminal. In an example, where terminal 110 is a POS terminal, a data transfer between the electronic device 100 and terminal 110 may be made to process a payment to a party, such as a merchant, associated with the terminal 110. For example, the electronic device 100 may transmit a secure token or other identifier to the terminal 110 during a transaction. This secure token or identifier may be provided by the electronic device 100 based on issuer data that is provided by an issuer, such as a credit card issuer. For example, in some embodiments, the secure token or identifier may be or may include a primary account number (PAN), a tokenized PAN, or a cryptographic PAN.

The secure token or identifier may be transmitted over a short-range communication system, such as a near field communication (NFC) interface. A POS terminal uses this token in order to determine whether a transaction is to be approved or declined. For example, as further described below, the terminal 110 may communicate with an issuer system via a network provider and may provide the token or other secure information to the issuer system.

The server 130 is a computer system. The server 130 may be, for example, a mainframe computer, a minicomputer, or the like. The server 130 may include one or more computing devices. For example, the server 130 may include multiple computing devices such as, for example, database servers, compute servers, and the like. The multiple computing devices may be in communication by a network such as, using the network 120. In another example, the multiple computing devices may communicate using another network such as, for example, a local-area network (LAN). In some embodiments, the server 130 may include multiple computing devices organized in a tiered arrangement. For example, server 130 may include middle-tier and back-end computing devices. In some embodiments, server 130 may be a cluster formed of a plurality of interoperating computing devices.

The network 120 is a computer network. The network 120 allows computer systems in communication therewith to communicate. For example, as illustrated, the network 120 may allow the terminal 110 to communicate with the server 130.

In some embodiments, data transfers between the terminal 110 and the server 130 may be based on one or more data transfers between the electronic device 100 and the terminal 110. For example, a data transfer between the electronic device 100 and the terminal 110 may trigger a corresponding data transfer from the terminal 110 to the server 130. In a specific example, where data transfers between the electronic device 100 and the terminal 110 corresponds to a payment transaction, the terminal 110 may communicate with the server 130 to authorize the payment. For example, the server 130 may authenticate that the payment is authorized and/or that there is available credit associated with a payment method selected for data transfer to make the payment transaction. In some such examples, server 130 may be an issuer system and the network 120 may be operated by a network provider as discussed above. For example, the server 130 may be an issuer system may be operated by a bank and the network 120 may be operated by a credit card network provider such as, for example, Visa™, Mastercard™, American Express™, or the like. In some such embodiments, the network provider may relay transaction information and the token or other secure information to issuer systems such as, for example, the server 130 which may approve or denies the transaction and then may send a message to a POS terminal such as, for example, the terminal 110, either approving or declining the transaction. In some embodiments, the POS terminal, may then, in turn, relay this to a device such as the electronic device 100. For example, in some embodiments, the terminal 110 may relay an approval or denial outcome to the electronic device 100. Additionally or alternatively, the terminal 110 may include means for providing approval or denial to a user such as, for example, a display.

Figure 2:
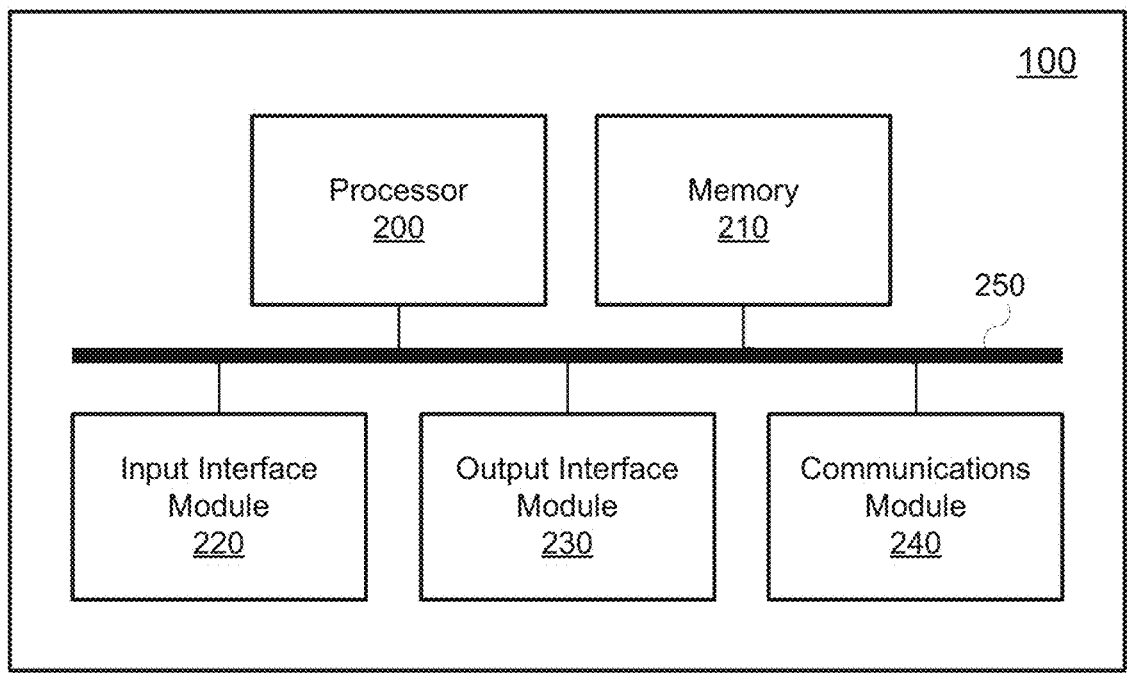
FIG. 2 is a high-level operation diagram of an example electronic device.

Returning to the electronic device 100, FIG. 2 is a high-level operation diagram of the electronic device 100. As will be discussed in greater detail below, the electronic device 100 includes data transfer application software that allows a user to perform or control data transfers.

The electronic device 100, a computing device, includes a variety of modules. For example, as illustrated, the electronic device 100, may include a processor 200, a memory 210, an input interface module 220, an output interface module 230, and a communications module 240. As illustrated, the foregoing example modules of the electronic device 100 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 100.

The input interface module 220 allows the electronic device 100 to receive input signals. Input signals may, for example, correspond to input received from a user. The input interface module 220 may serve to interconnect the electronic device 100 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the electronic device 100 to provide output signals. Some output signals may, for example allow provision of output to a user. The output interface module 230 may serve to interconnect the electronic device 100 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps such as for, example, light-emitting diodes (LEDs), and printers. In some embodiments, all or a portion of the output interface module 230 may be integrated with an output device. For example, the output interface module 230 may be integrated with one of the aforementioned example output devices.

The communications module 240 allows the electronic device 100 to communicate with other electronic devices and/or various communications networks. For example, the communications module 240 may allow the electronic device 100 to send or receive communications signals. Communications signals may be sent or received according to one or more protocols or according to one or more standards. For example, the communications module 240 may allow the electronic device 100 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the electronic device 100 to communicate using near-field communication (NFC), via Wi-Fi™, using Bluetooth™ or via some combination of one or more networks or protocols. For example, where the terminal 110 is a payment terminal such as a POS terminal, the electronic device 100 may communicate via the communications module 240 to effect contactless payments. Contactless payments may be made using NFC. In some embodiments, all or a portion of the communications module 240 may be integrated into a component of the electronic device 100. For example, communications module may be integrated into a communications chipset.

Software comprising instructions is executed by the processor 200 from a computer-readable medium. For example, software may be loaded into random-access memory from persistent storage of memory 210. Additionally or alternatively, instructions may be executed by the processor 200 directly from read-only memory of memory 210.

Figure 3:
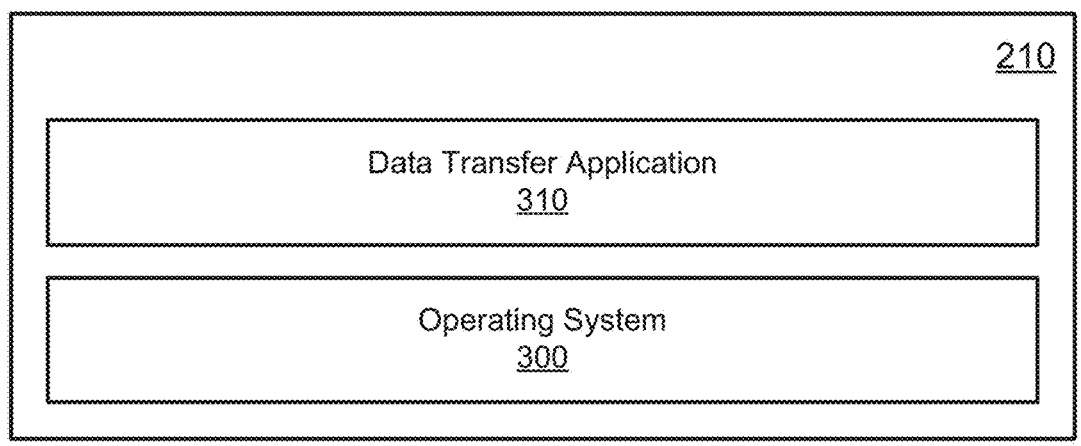
FIG. 3 depicts a simplified software organization of the example electronic device of FIG. 2.

FIG. 3 depicts a simplified organization of software components stored in memory 210 of the electronic device 100. As illustrated these software components include an operating system 300 and a data transfer application 310.

The operating system 300 is software. The operating system 300 allows the data transfer application 310 to access the processor 200, the memory 210, the input interface module 220, the output interface module 230 and the communications module 240. The operating system 300 may be, for example, Apple iOS™, Google™ Android™, Linux™, Microsoft™ Windows™, or the like.

The data transfer application 310 adapts the electronic device 100, in combination with the operating system 300, to operate as a device for performing data transfers according to a variety of supported data transfer methods. The data transfer application 310 may be particular to a particular domain or application. For example, the data transfer application 310 may be a loyalty program application for making data transfers corresponding to particular loyalty programs. In another example, the data transfer application 310 may be a financial application for making data transfers corresponding to financial data. More particularly, the data transfer application 310 may, for example, be a payment application for making data transfers corresponding to particular payment methods. For example, the data transfer application 310 may be a mobile payment application such as when the electronic device 100 is a mobile device. In yet another example, the data transfer application 310 may support making data transfers corresponding to a variety of domains. For example, in some embodiments, the data transfer application 310 may make data transfers corresponding to both payment methods and loyalty programs.

The data transfer application 310 may include one or more submodules.

Figure 4:
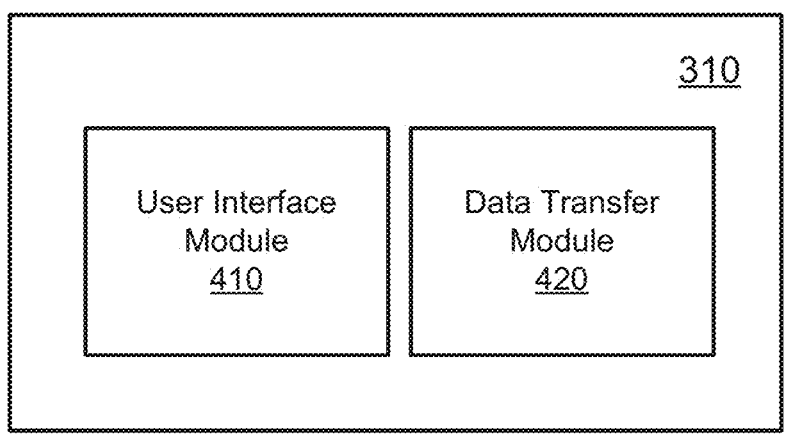
FIG. 4 depicts a simplified organization of software modules exemplary of an embodiment of a data transfer application.

FIG. 4 depicts a simplified organization of submodules exemplary of an embodiment of the data transfer application 310.

As illustrated, the data transfer application 310 includes a user interface module 410 and a data transfer module 420.

The user interface module 410 provides user interface for the data transfer application 310. In some embodiments, the provided user interface may be visual and may include one or more screens or panels allowing a user to configure and control various aspects of the data transfer application 310 and to otherwise review other information related to aspects of the data transfer application 310. For example, a visual user interface may be provided using a display screen accessed via the output interface module 230 (FIG. 2).

The user interface module 410 may process input provided by a user such as may be received, for example, via the input interface module 220 (FIG. 2). For example, a user may provide input for processing by the user interface module 410 using an input device such as, for example, a touch display screen from which input is received. The input from the input device may be received via the input interface module 220.

Additionally or alternatively, the user interface module 410 may provide one or more other forms of user interface such as, for example, an audio-based interface such as may, for example, use text-to-speech or voice recognition to interact with a user.

The data transfer module 420 is responsible for initiating and controlling data transfers performed using the data transfer application 310.

The data transfer module 420 may be configurable to support various different data transfer methods. For example, data transfers may correspond to one or more data types such as, for example, payments or loyalty rewards. In one example, the data transfer module 420 may support making payments and the various data transfer methods may correspond to different payment methods such as, for example, different credit cards, debit cards, bank accounts, or the like. In another example, the data transfer module 420 may support loyalty reward data transfers and the different data transfer methods may correspond to different loyalty programs. In some embodiments, the data transfer module 420 may support multiple data transfer modalities. For example, the data transfer module 420 may support both making payments and data transfers for loyalty rewards.

In some embodiments, the data transfer module 420 may be provisioned to support one or more data transfer methods during a provisioning stage.

For example, where the data transfer module 420 supports making payments via credit card, the provisioning may include configuring a secure element with a token corresponding to a payment method. For example, the secure element may be configured to store or generate a secure token or other identifier such as may be sent to a POS terminal during a transaction in manners described above. In another example, provisioning for a payment method may include configuring the system to support payments using host-based card emulation (HCE) via the operating system 300 (FIG. 3).

In another example, where the data transfer module 420 supports loyalty programs, the provisioning may include receiving an identifier for the loyalty program such as, for example, a membership number.

Figure 5:
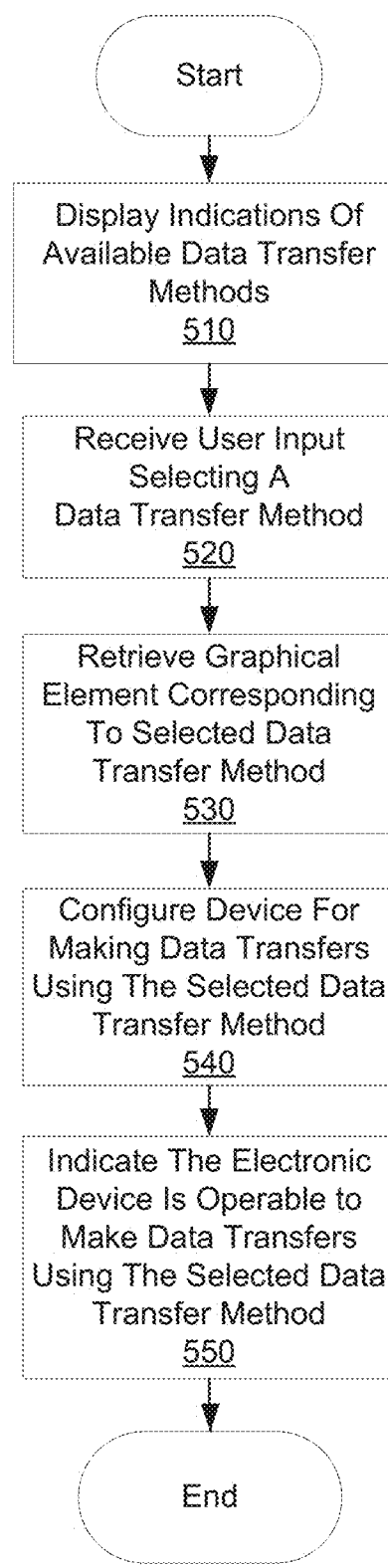
FIG. 5 is a flowchart depicting example operations performed by the data transfer application of FIG. 3.

The operation of the data transfer application 310 is described with reference to the flowchart of FIG. 5. Operations 510 and onward are performed by the processor 200 executing the data transfer application 310 at the electronic device 100.

At the operation 510, the processor 200 causes indications corresponding to various data transfer methods supported by the data transfer module 420 to be provided such as by way of signalling via the output interface module 230 (FIG. 2).

For example, indications corresponding to the data transfer methods may be displayed via the output interface module 230.

Figure 6:
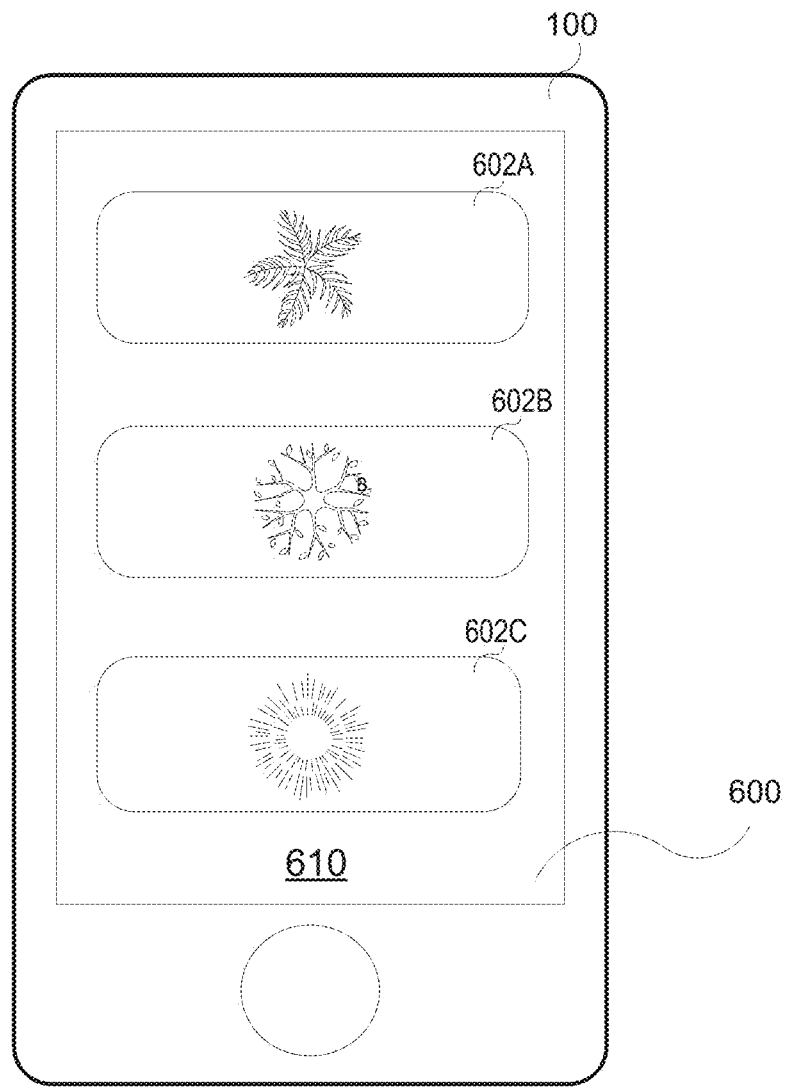
FIG. 6 depicts an electronic device displaying a screen of the user interface of the data transfer application of FIG. 3.

For example, a screen of a user interface may be presented on a display screen that includes indications that list available data transfer methods. In a specific example, a screen 610 of a user interface of the data transfer application 310 is shown in FIG. 6 illustrating an example of how indications listing available transfer methods may be display. As illustrated, a display screen 600 of the electronic device 100 displays the screen 610 of the user interface. The screen 610 includes a series of indications 602A-C.

In some embodiments, the display screen 600 may be a touchscreen display and may permit a user to review the indications and, as will be discussed in greater detail below, to convey a selection of one of the data transfer methods to the electronic device 100.

As illustrated, three indications—a first indication 602A which includes a palm tree icon, a second indication 602B which includes a deciduous tree icon, and a third indication 602C, which includes an evergreen tree icon—are included in the screen 610.

More broadly, indications may take other forms. For example, displayed indications may include text or other graphics in addition to or as an alternative to an icon. For example, where the data transfer methods correspond to payment types, the indications may include a logo of a card issuer. Alternatively, for data transfer methods corresponding to a loyalty program, the indications may include a logo of the loyalty program and/or an indication of the member name or number. In another example, if an audio interface is provided, indications may be provided by way of spoken prompts.

Notably, in some embodiments, there may be more or fewer data transfer methods and, correspondingly, more or fewer indications displayed. Additionally or alternatively, indications corresponding to further data transfer methods may be presented where a user somehow interacts with the electronic device 100. For example, if a large number of data transfer methods are supported, a user may be provided with functionality for scrolling the list of indications to access indications corresponding further data transfer methods. In a particular example, where the display screen 600 is a touchscreen, a user may be able to access further data transfer methods by way of a scroll gesture.

Returning to FIG. 5, following the operation 510, flow control proceeds to an operation 520.

At the operation 520, the electronic device 100 receives a signal representing a selection of one of the data transfer methods for use in making a subsequent data transfer. The aforementioned signal may be received by way of the input interface module 220 (FIG. 2).

The received signal may correspond to an indication of a selection of one of the data transfer methods for use in making a subsequent data transfer. The electronic device 100 and, more particularly, the data transfer application 310 may be configured so that one or more data transfers can be made using the selected data transfer method.

For example, the user may provide a selection of one of the displayed indications to select a data transfer method. More specifically, turning again to the example of FIG. 6, a signal may be received corresponding to an activation of one of the displayed indications 602A-C by a user indicating a selection of the corresponding one of the data transfer methods. For example, where the display screen 600 is a touchscreen, the user may tap or touch one of the displayed indications 602A-C to activate it. In another example, a signal may be received from an input device such as, for example, a keyboard or a mouse such as may, for example, be interfaced with the electronic device 100 by way of the input interface module 220, and may be used by a user to select a data transfer method.

In a specific example, a user may activate the first indication 602A to select the palm data transfer method denoted by the palm icon.

Returning to FIG. 5, following the operation 520, control flow proceeds to an operation 530.

At the operation 530, a graphical element corresponding to the selected data transfer method is retrieved.

Returning to the example of FIG. 6, in a first example, if the first indication 602A is activated, a first graphical element may be retrieved. In a second example, if the second indication 602B is activated, a second graphical element may be retrieved. In a third example, if the third indication 602C is activated, a third graphical element may be retrieved.

Turning back to FIG. 5, as will be discussed in greater detail below, the graphical element retrieved at the operation 530 is used by the user interface module 410 in modifying the user interface presented by the data transfer application 310 to convey the electronic device 100 has been suitably configured so as to be operable to perform a data transfer using the selected data transfer method. For example, it may convey that the electronic device 100 is ready to make a data transfer using the selected data transfer method. Put differently, the user interface presented by data transfer application 310 may be modified to convey that a selected data transfer method is ready for use once the electronic device 100 has been suitably configured.

The graphical element includes data that may be used to display or otherwise provide graphics corresponding to the selected data transfer method. For example, the graphical element, may include an image, fonts, text or any combination thereof. Images may include icons, bitmaps, vector graphics, or the like. In another example, the retrieved graphical element may include metadata describing various user interface changes that can be made to the user interface of the data transfer application 310 (FIG. 3). For example, the retrieved graphical element may include metadata customizing the look of the data transfer application 310—i.e. an interface skin. In other words, the graphical element may be or may include a skin for the data transfer application 310.

In some embodiments, the graphical element may be retrieved from the memory 210 (FIG. 2) based on the selected data transfer method. For example, the graphical element may be retrieved from the memory 210 having been previously received via the communications module 240 such as, for example, where one or more graphical elements were previously received during a provisioning stage. For example, a graphical element may be received when a particular data transfer method is first configured or provisioned in the data transfer application 310 or otherwise configured or provisioned in the electronic device 100. A graphical element received via the communications module 240 may be stored in the memory 210 such as, for example, in a look-up table data structure, and then later retrieved therefrom when the associated data transfer method is selected. In some embodiments, a cache may be employed, with graphical elements received from a cache in the memory 210. In the case of a cache miss—i.e. a failed lookup in such a cache such as may occur where a graphical element has not yet been stored in the cache for a particular data transfer method or where the graphical element for a particular data transfer element has been ejected such as may occur, for example, due to cache size constraints—the graphical element may instead be received via the communications module 240.

Alternatively, the graphical element may be received via the communications module 240 (FIG. 2), triggered by the received selection.

From the operation 530, control flow proceeds to an operation 540.

At the operation 540, the electronic device 100 is configured for making data transfers using the selected data transfer method. More particularly, the data transfer module 420 may configure various aspects of the hardware and software of the electronic device 100 to ready or otherwise prime those facets of the electronic device 100 to make data transfers using or according to the selected data transfer method.

For example, the data transfer module 420 may configure or initialize aspects of the operating system 300. In another example, the data transfer module 420 may initialize or configure various communications components. For example, the data transfer module 420 may configure various communications components integrated into or accessible by way of the communications module 240.

In a specific example, the data transfer module 420 may initialize near-field communications (NFC) hardware such as, for example, by way of the communications module 240. For example, where the selected data transfer method is a payment method, the data transfer module 420 may initialize or configure an NFC device (which may be coupled to the processor) for making a contactless payment using that payment method. In a particular example, an NFC subsystem may be placed into an NFC card mode to allow for making contactless payments using the selected payment method. In some embodiments, contactless payments may be made via communication with a POS terminal in manners described above.

Following the operation 540, control flow proceeds to an operation 550.

At the operation 550 the user interface of the electronic device 100 is modified based on the retrieved graphical element so as to indicate that the electronic device 100 is ready to make data transfers using the selected data transfer method. The user interface of the electronic device 100 may be modified based on the retrieved graphical element.

In one example, the user interface of the data transfer application 310 may be modified. In particular, the user interface may be modified based on the graphical element. For example, the graphical element may be presented in the user interface of the data transfer application 310 whenever that user interface is presented via the output interface module 230. In a particular example, the graphical element may be presented whenever the user interface of the data transfer application 310 is displayed or, put differently, visible, via the output interface module 230. For example, the graphical element may be presented in the user interface of the data transfer application 310 whenever it is displayed on the display screen 600.

In another example, an icon for launching the data transfer application 310 may be modified to correspond to the graphical element. For example, an icon displayed in an application launcher system screen of electronic device 100 may be modified to correspond to the graphical element. In a specific example, the graphical element may include the icon.

A series of examples of modifications of the user interface of the electronic device 100 based on a graphical element are illustrated (FIGS. 7, 8, 9B, and 9C) and described below.

By way of example, each of the illustrated examples presumes that the data transfer method corresponding to the first indication 602A of FIG. 6—i.e. with the palm icon—has been selected.

Figure 7:
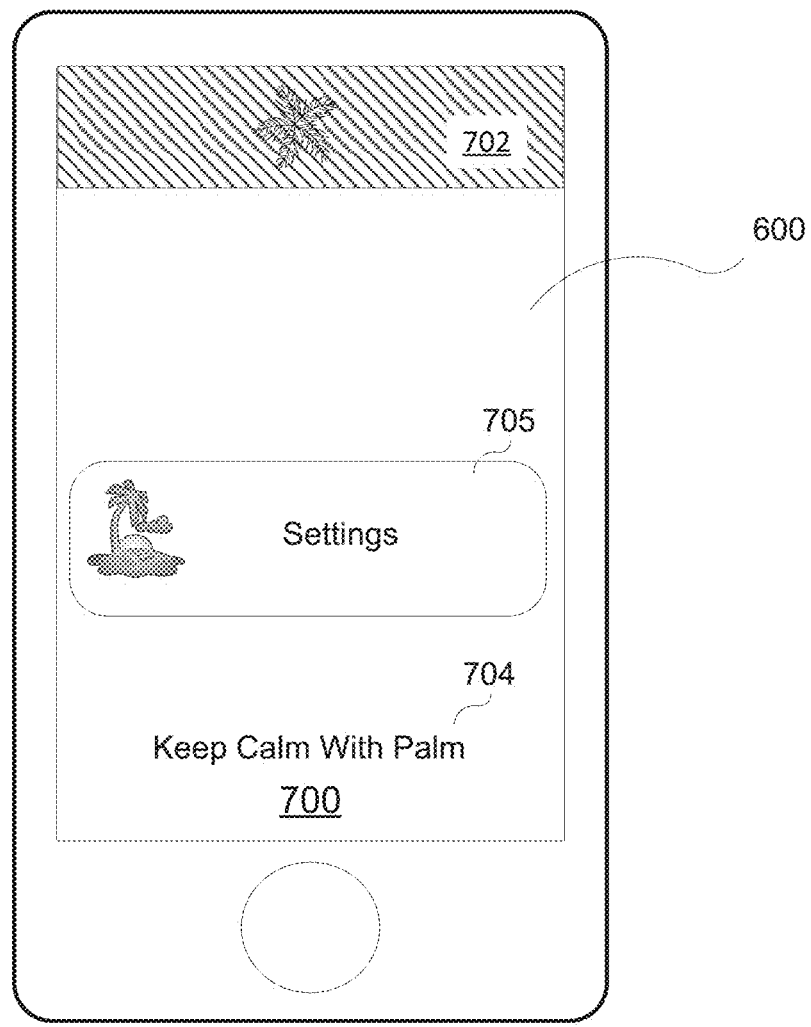
FIG. 7 depicts the electronic device of FIG. 6 displaying another screen of the user interface of the data transfer application of FIG. 3.

FIG. 7 illustrates the display screen 600 of the electronic device 100 depicting a screen 700 of the user interface of the data transfer application 310 (FIG. 3).

As illustrated, in the screen 700 (such as may have been rendered by the user interface module 410 (FIG. 4)), a border 702 has been added to the screen 700 along one edge of the display screen 600. Notably, the border 702 includes a palm icon signifying that the palm data transfer method has been selected. Additionally or alternatively, the border 702 may feature a color or pattern associated with the selected data transfer method. For example, the border 702 may feature a color or pattern associated with the palm data transfer method.

The border 702 is merely an example border and all manners of borders are contemplated. Borders may be provided along one or more edges of the display screen 600. For example, in some embodiments, a border corresponding to the graphical element may be displayed along one or more other edges of the display screen 600 instead of or in addition to along the particular edge illustrated in FIG. 7. Borders may be positioned so as to avoid or limit interference with the accessibility and/or usability of the interface of the data transfer application. The design of a border may be selected to avoid alteration of the interactive design of the application, such as, for example, changes in the way individuals might interface with the application absent that border.

Additionally or alternatively, the user interface of the data transfer application 310 may also be modified to incorporate design elements associated with the selected data transfer methods in other aspects of the application. In the illustrated example, text 704 conveying a slogan associated with the palm method ("Keep Calm With Palm") is shown. Additionally, another palm icon is included in a settings button 705.

The particular combination of user interface customizations illustrated in FIG. 7 is simply an example. Other embodiments may feature other user interface customizations or different combinations of user interface customizations. For example, other embodiments may provide a combination of all or some of the customizations illustrated in FIG. 7.

Additionally or alternatively, various screens of the user interface of the data transfer application 310 may be modified in similar or different manners than other screens of the user interface of the data transfer application 310.

Figure 8:
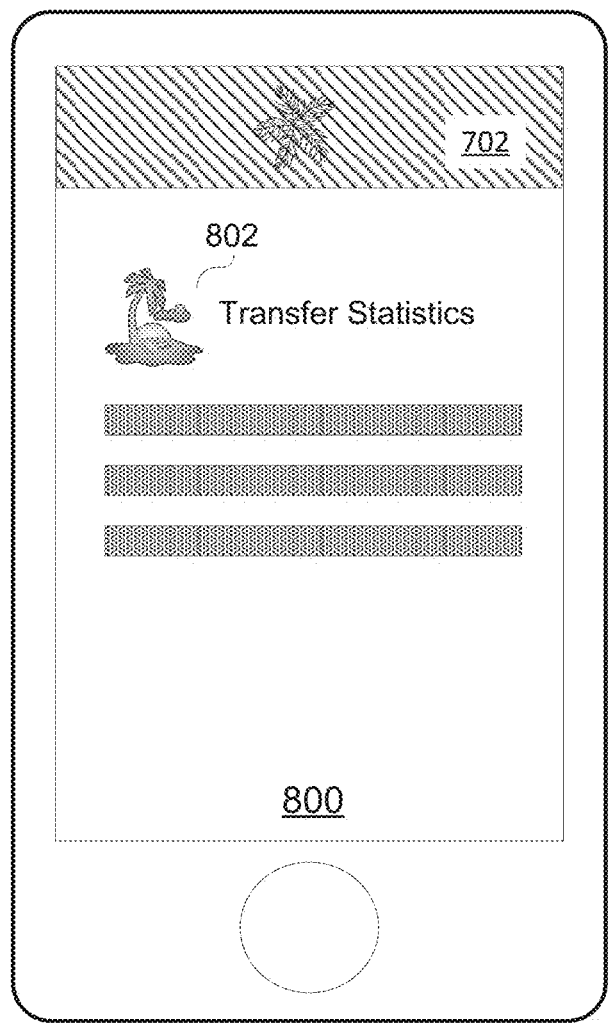
FIG. 8 depicts the electronic device of FIG. 6 displaying yet another screen of the user interface of the data transfer application of FIG. 3.

FIG. 8 depicts the electronic device 100 depicting a screen 800 of the data transfer application 310. In the illustrated example, the screen 800 has been modified based on a graphical element corresponding to the selected palm data transfer method. The screen 800 presents data transfer statistics. For example, where the data transfer methods correspond to loyalty programs, the statistics may correspond to a number of loyalty points. In a specific example, the statistics may correspond to the number of loyalty points earned in the last transaction or within a particular time period such as, for example, the last day or hour. In another example, where the data transfer methods correspond to payment methods, the statistics may correspond to spending. For example, the statistics may enumerate an amount spent on the last or a specified number of previous transactions or within a particular time period. Notably, the screen 800 includes a palm icon 802 in association with explanatory text setting out the purpose of the screen 800. Conveniently, in this way, a user may understand the particular data transfer method (i.e. the selected data transfer method) to which the statistics pertain.

Additionally, the border 702 is also presented in the screen 800. Indeed, in some embodiments, the border 702 may be presented in most or even all of the screens of the user interface of the data transfer application 310. In this way, a user of the data transfer application 310 may, at a glance, be able to determine the selected data transfer method and may be able to avoid or limit resort to particular configuration screens of the user interface of the data transfer application 310.

In some embodiments, the user interface of the operating system 300 may be modified in addition to or as an alternative to modifying the user interface of data transfer application 310. For example, a system screen of the operating system 300 may be modified based on the graphical element. For example, the graphical element may be configured to present the graphical element or one or more elements thereof when the system screen is displayed. In a specific example, a system screen such as, for example, a lock screen, an application launch screen, or a home screen, may be modified based on the graphical element in manners analogous to those described above for the user interface of the data transfer application.

Figure 9A:
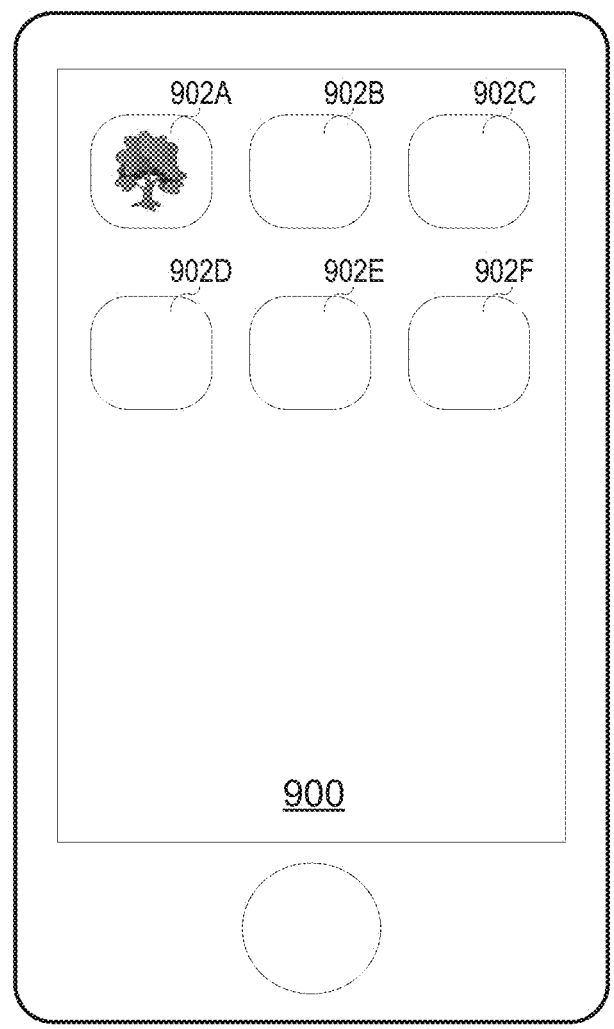
FIG. 9A depicts the electronic device of FIG. 6 displaying an example system screen.
Figure 9B:
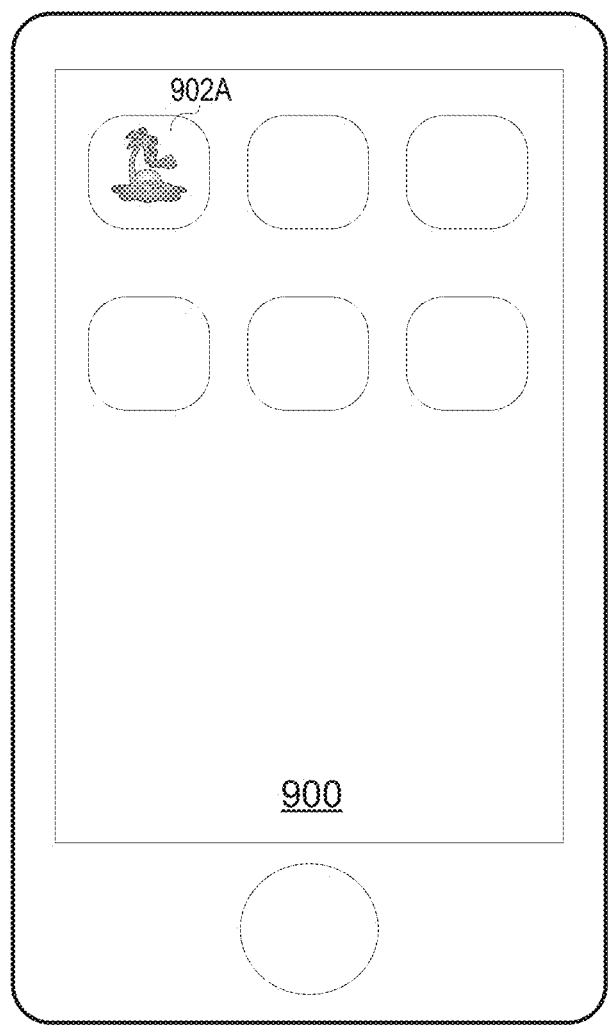
FIG. 9B depicts a variation on the example system screen of FIG. 9A.
Figure 9C:
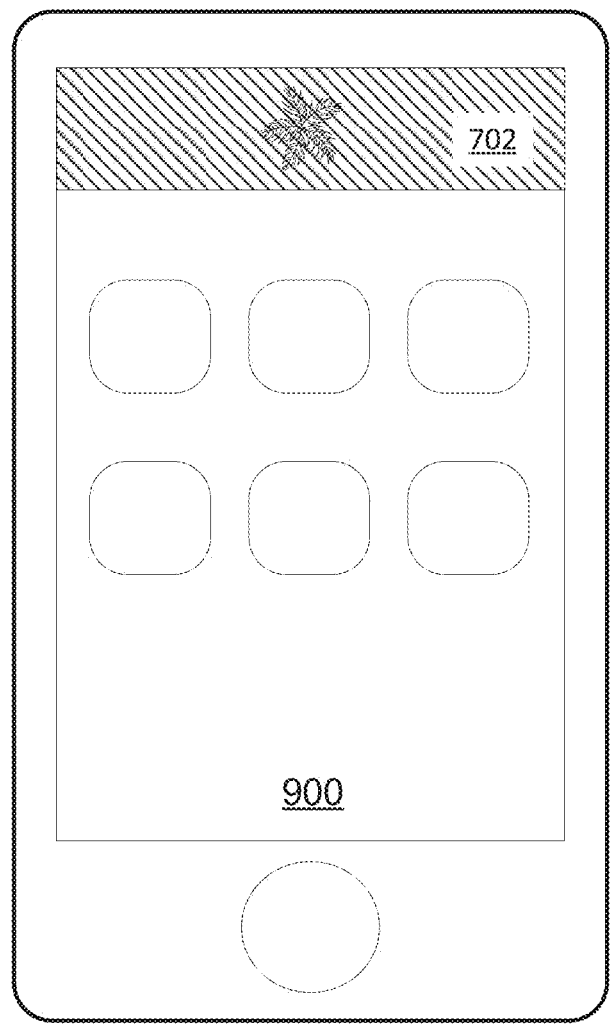
FIG. 9C depicts another variation on the example system screen of FIG. 9A.

A series of example modifications to example system screens will now be illustrated by way of FIGS. 9A-9C.

As noted above, each of the illustrated examples presumes that the data transfer method corresponding to the first indication 602A of FIG. 6—i.e. with the palm icon—has been selected.

FIG. 9A depicts a system screen of the operating system 300. In particular, a home screen 900 is depicted.

As illustrated, the home screen 900 features a number of icons 902A-F corresponding to applications installed on the electronic device 100. The home screen 900 allows those applications to be launched by activating the corresponding one of the icons 902A-F. Accordingly, the home screen 900 may also be considered or referred to as an application launcher system screen.

The data transfer application launch icon 902A, featuring a generic tree icon, corresponds to the data transfer application 310.

FIG. 9B depicts how the home screen 900 may be modified to reflect a selected data transfer method by changing the icon 902A to a palm tree icon to show that the palm data transfer method has been selected by the user.

In another example, FIG. 9C depicts how the border 702 may, in some embodiments, also be made visible in some or all system screens. For example, as illustrated, the border 702 may be added to the home screen 900. As discussed above, all manners of borders are contemplated.

A variety of other variations on user interface modification based on a graphical element will now be described.

In some embodiments, graphical elements may be updated periodically. In such cases, some or all of the user interface of the data transfer application 310 or, more broadly, the user interface of the electronic device 100, may be modified based on updated graphical elements. For example, a border such as the border 702 could be varied based on the updated graphical element. In another example, the icon associated with the data transfer application 310, such as the icon 902A, may be varied or changed.

In some embodiments, updates to the graphical element associated with a data transfer method may be modified based on particular events occurring. For example, an update may be triggered by an event. An event may, for example, be triggered by receipt of an updated graphical element by way of the communications module 240 (FIG. 2). Additionally or alternatively, the receipt of a graphical element may itself be an event that triggers an update to the modifications based on that graphical element and update to the graphical interface of the data transfer application 310 and/or of the electronic device 100 such as, for example, update to one or more system screens. Put differently, at least one of the presentation of the graphical element in the user interface of the data transfer application 310 and/or the electronic device 100 and the icon for launching data transfer application 310 may be updated based on an updated graphical element. In another example, an event may be triggered by another application on the user's device for which a purchase is being made. For example, in some embodiments, it may also be possible to initiate data transfers via other than the data transfer application. In some such embodiments, another application initiating a payment authorization, may be an event that triggers an update to the modifications such as, for example, based on a particular payment method associated with the alternate application.

In another example, updates or modifications to the graphical element or the rendered screens of the user interface may be queued with changes to the user interface later presented when one or more defined conditions are detected. For example, the user interface customizations may be updated for a revised or changed graphical element (or some aspects thereof) based on the date changing to a particular date, on the location of the electronic device 100 matching or falling within some particular location or area or some other condition occurring.

In some embodiments, the electronic device 100 may include one or more modules that may be used in determination a location of the electronic device 100 such as, for example, for use in detecting a condition for triggering a change in the user interface of the electronic device 100. The operating system 300 (FIG. 3) may include a location subsystem that determines a location of the electronic device 100 based on signals received from the one or more modules. For example, the electronic device 100 may include one or more of a receiver for a global navigation satellite system that is accessed by the location subsystem to determine location. In some embodiments signals may be received from the receiver via the input interface module 220 or the communications module 240. In a specific example, the electronic device 100 may include a receiver for one or more of Global Positioning Satellite (GPS) signals, Global Navigation Satellite System (GLONASS) signals, or the like, that provide position data such as, for example longitude and latitude, for the electronic device 100. Additionally or alternatively, the electronic device 100 may include Wi-Fi™ and/or cellular modules that may be utilized in determining location. Such modules may, for example, be accessed via the communications module 240. Such modules may be used in determining location. For example, the electronic device 100 may determine location based on one or more cell tower signals received using a cellular module and/or the identities—e.g. the Service Set Identifiers (SSIDs)—of accessible Wi-Fi base stations. In some embodiments, a combination of methods for determining location may be combined. Combining the results of methods for determining location may result in a more accurate determination of location.

In one specific example, for a data transfer method that is a payment method branded to correspond to various sports franchises in a particular geography, the graphical element may allow updating user interface based on the particular one of those franchises that is playing or is next due to play a game. For example, the graphical element may include images of the logo of the franchises and the logo or logos corresponding to the franchises that are playing or are next due to play a game may be displayed based on the event of a change in which team is playing or which team is to play next. Franchise logos may be displayed in a border in the user interface of the data transfer application 310 and/or in the user interface of the electronic device 100 such as, for example, in a system screen. Additionally or alternatively, the icon used to launch the data transfer application 310 may be changed to include the relevant franchise logo. Conveniently, by so modifying the user interface of the data transfer application 310 and/or the electronic device 100, additional information (i.e. which team is playing) may be provided above and beyond the fact that the payment method corresponding to the various sport franchises is selected.

In some embodiments, the updated graphical element may correspond to one or more characteristics of the detected event.

In one example, where the detected event is that the electronic device 100 is in particular location, the updated graphical element may correspond to the detected location by, for example, incorporating one or more elements of items related to the area of a detected location. In a specific example, where the selected data transfer method is a payment method branded to correspond to a particular sports league, the graphical element may provide for customizing the user interface of the data transfer application 310 and/or the electronic device 100 based on the current location of the electronic device 100. For example, user interface may be modified based on location to provide one or more elements corresponding to the local franchise in that league. In another example, the launch icon of the data transfer application 310 may be changed to the logo of the local franchise.

In another example, where the detected event is that the current date is a particular date, the graphical element may include aspects corresponding to an event occurring on or about that date. In one specific example, the user interface of the data transfer application 310 and/or the electronic device 100 may be made to include holiday motifs or holiday variations of aspects corresponding to a selected data transfer method on dates during the Christmas season based on aspects included in the graphical element. In another specific example, the user interface of the data transfer application 310 and/or the electronic device 100 may be changed to an orange and black colored variation on Halloween. In yet another example, the icon used to launch the data transfer application 310 may be changed to correspond to the date. For example, in winter the icon could be modified to include snow.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. An electronic device comprising:
an input interface module;
an output interface module including a display screen;
a processor coupled to the input interface module and the output interface module;
a memory coupled to the processor and storing a data transfer application comprising instructions which, when executed by the processor, cause the electronic device to:
display, via the output interface module, indications corresponding to a plurality of data transfer methods;
receive, via the input interface module, a selection of one of the data transfer methods for use in making a subsequent data transfer;
retrieve a graphical element corresponding to the selected data transfer method;
configure the electronic device for making data transfers using the selected data transfer method; and
indicate that the electronic device is operable to perform data transfers using the selected data transfer method by presenting the graphical element in an interface of the data transfer application whenever the interface is displayed via the output interface module, wherein presenting the graphical element in the interface of the data transfer application comprises displaying a border based on the graphical element extending along and from one or more edges of the display screen.

2. The electronic device of claim 1 wherein the graphical element is a skin for the data transfer application.

3. The electronic device of claim 1 wherein the instructions further configure the electronic device to present the graphical element when a system screen is displayed, the system screen being at least one of a home screen, an application launcher system screen, and a lock screen.

4. The electronic device of claim 1 wherein the graphical element is retrieved from the memory.

5. The electronic device of claim 4 further comprising a communications module coupled to the processor wherein the graphical element was received via the communications module and stored in the memory during a provisioning stage in which the data transfer application is configured to allow the selected data transfer method to be used for a first time.

6. The electronic device of claim 1 wherein the instructions further configure the electronic device to update the presentation of the graphical element in the interface based on an updated graphical element.

7. The electronic device of claim 6 wherein the updating is triggered based on an event, the event including at least one of detecting that a location of the electronic device corresponds to a particular location and detecting that a current date matches a particular date.

8. The electronic device of claim 1 wherein the data transfer application is a mobile payment application and wherein the selected data transfer method is a payment method.

9. The electronic device of claim 8 further comprising a near-field communications (NFC) device coupled to the processor and wherein configuring the electronic device for making data transfers using the selected data transfer method comprises configuring the NFC device for making a contactless payment.

10. A computer-implemented method comprising:
displaying, via an output interface module of an electronic device, indications corresponding to a plurality of data transfer methods available in a data transfer application;
receiving, via an input interface module of the electronic device, a selection of one of the data transfer methods for use in making a subsequent data transfer;
retrieving a graphical element corresponding to the selected data transfer method;
configuring the electronic device for making data transfers using the selected data transfer method; and
indicating that the electronic device is operable to perform data transfers using the selected data transfer method by presenting the graphical element in an interface of the data transfer application whenever the interface is displayed via the output interface module, wherein the output interface module includes a display screen and wherein presenting the graphical element in the interface of the data transfer application comprises displaying a border based on the graphical element extending along and from one or more edges of the display screen.

11. The method of claim 10 wherein the graphical element is a skin for the data transfer application.

12. The method of claim 10 further comprising configuring the electronic device to present the graphical element when a system screen is displayed, the system screen being at least one of a home screen, an application launcher system screen, and a lock screen.

13. The method of claim 10 wherein the graphical element is retrieved from a memory of the electronic device.

14. The method of claim 13 further comprising:
during a provisioning stage to configure the data transfer application to allow the selected data transfer method to be used for a first time:
receiving, via a communications module of the electronic device, a signal representing the graphical element; and
storing the graphical element in the memory.

15. The method of claim 10 further comprising updating the presentation of the graphical element in the interface based on an updated graphical element, wherein the updating is triggered based on an event, the event including at least one of detecting that a location of the electronic device corresponds to a particular location and detecting that a current date matches a particular date.

16. The method of claim 10 wherein the data transfer application is a mobile payment application and wherein the selected data transfer method is a payment method.

17. The method of claim 10 wherein configuring the electronic device for making payments using the selected payment method comprises configuring a near-field communications device of the electronic device for making a contactless payment.

18. A non-transitory computer readable storage medium storing instructions which, when executed by a processor of an electronic device, cause the electronic device to:
display, via an output interface module of the electronic device, indications corresponding to a plurality of data transfer methods available in a data transfer application;

receive, via an input interface module of the electronic device, a selection of one of the data transfer methods for use in making a subsequent data transfer;

retrieve a graphical element corresponding to the selected data transfer method;

configure the electronic device for making data transfers using the selected data transfer method; and indicate that the electronic device is operable to perform data transfers using the selected data transfer method by presenting the graphical element in an interface of the data transfer application whenever the interface is displayed via the output interface module, wherein the output interface module includes a display screen and wherein presenting the graphical element in the interface of the data transfer application comprises displaying a border based on the graphical element extending along and from one or more edges of the display screen.

19. The electronic device of claim 1 wherein the instructions further configure the electronic device to:

indicate that the electronic device is operable to perform data transfers using the selected data transfer method by modifying an icon for launching the data transfer application to correspond to the graphical element.

20. The method of claim 10 further comprising:

indicating that the electronic device is operable to perform data transfers using the selected data transfer method by modifying an icon for launching the data transfer application to correspond to the graphical element.

* * * * *